United States Patent
Johann et al.

(10) Patent No.: US 8,652,326 B2
(45) Date of Patent: Feb. 18, 2014

(54) DEVICE FOR THE CONTINUOUS ELECTROCHEMICAL DEIONISATION WITH INTEGRATED MEMBRANE UNIT

(71) Applicant: Christ Water Technology AG, Mondsee (AT)

(72) Inventors: Jurgen Johann, Nussloch (DE);
Thomas Menzel, Pfeffingen (CH);
Monique Bissen, Mondsee (AT);
Thomas Schramm, Lorrach (DE);
Christian Brand, Morschwiller le bas (FR)

(73) Assignee: Christ Water Technology AG, Mondsee (AT)

( * ) Notice: Subject to any disclaimer, the term of this patent is extended or adjusted under 35 U.S.C. 154(b) by 0 days.

(21) Appl. No.: 13/626,094

(22) Filed: Sep. 25, 2012

(65) Prior Publication Data
US 2013/0020260 A1    Jan. 24, 2013

Related U.S. Application Data

(63) Continuation of application No. 11/696,474, filed on Apr. 4, 2007, now abandoned.

(30) Foreign Application Priority Data

Apr. 6, 2006  (CH) .......................... 57006

(51) Int. Cl.
*B01D 61/14* (2006.01)
*B01D 61/58* (2006.01)

(52) U.S. Cl.
USPC ...... 210/243; 210/295; 210/253; 210/321.72; 204/632

(58) Field of Classification Search
USPC .............. 204/632; 210/243, 253, 295, 321.72
See application file for complete search history.

(56) References Cited

U.S. PATENT DOCUMENTS

| 4,465,573 A | 8/1984 | O'Hare |
| 4,925,541 A | 5/1990 | Giuffrida et al. |

(Continued)

FOREIGN PATENT DOCUMENTS

| CA | 2526028 | 11/2004 |
| DE | 10115633 A1 * | 9/2002 |

(Continued)

OTHER PUBLICATIONS

E-Cell Owners Manual; Copyright 2000 E-Cell Corp.

(Continued)

*Primary Examiner* — Terry Cecil
(74) *Attorney, Agent, or Firm* — Thompson Coburn LLP (57) ABSTRACT

A device for the electrodeionization of an aqueous electrolyte solution, comprises an electrodeionization module (1), an ultrafiltration module (21, 22, 1201, 1202, 1203) and a connection piece (3, 10) which connects the electrodeionization module (1) and the ultrafiltration module (21, 22, 1201, 1202, 1203) such as to be able to guide a diluate produced from the electrolyte solution during operation of the device in the electrodeionization module (1) from the electrodeionization module (1) to the ultrafiltration module (21, 22, 1201, 1202, 1203); wherein the connection piece (3, 10) is devoid of an adjustable pressure-maintaining valve. Via the pressure drop occurring in the ultrafiltration modules (21, 22, 1201, 1202, 1203), these devices build up a counter pressure behind the electrodeionization module (1) which is sufficient to ensure the packing density of the ion exchanger in the electrodeionization module (1).

15 Claims, 4 Drawing Sheets

(56) References Cited

U.S. PATENT DOCUMENTS

| | | | |
|---|---|---|---|
| 5,045,198 | A | 9/1991 | Norton |
| 2,376,253 | A | 12/1994 | Rychen et al. |
| 6,190,528 | B1 | 2/2001 | Li et al. |
| 6,461,520 | B1 * | 10/2002 | Engelhard et al. ....... 210/748.12 |
| 6,733,646 | B2 | 5/2004 | Sato et al. |
| 6,824,662 | B2 * | 11/2004 | Liang et al. .................. 204/524 |
| 7,572,359 | B2 * | 8/2009 | Liang et al. .................. 204/632 |
| 2003/0141250 | A1 * | 7/2003 | Kihara et al. ................. 210/652 |
| 2010/0140153 | A1 | 6/2010 | Telepciak et al. |

FOREIGN PATENT DOCUMENTS

| | | | |
|---|---|---|---|
| EP | 508646 | A1 * | 10/1992 |
| EP | 570341 | A1 | 11/1993 |
| WO | 02076589 | A1 | 10/2002 |
| WO | WO 2004101119 | A1 * | 11/2004 |

OTHER PUBLICATIONS

Septron Manual (non-English); This manual mentions on p. 15 (point 5) the need for pressure adjustment of the diluate product. This deionisation system thus required a pressure-maintaining valve, which is no longer required according to the instant invention, 2001.

Ganzi et al., "Electrodeionization: Theory and Practice of Continuous Electrodeionization", Ultra Pure Water, Jul./ Aug. 1997, pp. 64-69.

Kirk-Othmer et al., "Hollow-Fiber Membranes", Encyclopedia of Chemical Technology: Gravity Concentration to Hydrogen Energy, 1984, pp. 492-517, Third Edition, vol. 12.

* cited by examiner

Fig. 6 ated module. The dilution chamber is filled
DEVICE FOR THE CONTINUOUS ELECTROCHEMICAL DEIONISATION WITH INTEGRATED MEMBRANE UNIT

RELATED APPLICATIONS

This patent application is a continuation of patent application Ser. No. 11/696,474, filed Apr. 4, 2007, which is now abandoned and which claims the benefit of CH 570/06, filed Apr. 4, 2006.

FIELD OF THE INVENTION

The invention relates to a new device for the continuous electrochemical desalination and filtration of aqueous solutions which s in the form of a spiral wound module.

PRIOR ART

The method of electrodeionisation per se has been known since the late 1950s. A description of the method was first given in Industrial and Engineering Chemistry 1955, Vol. 47, No. 1. Devices for performing the method in plate modules are described, for example, in U.S. Pat. No. 4,465,573 and U.S. Pat. No. 4,925,541.

Spiral wound modules for electrodeionisation, in which both the aqueous electrolyte solution to be desalinated and the concentrate are guided tangentially (i.e. from the outer casing surface spirally towards the inside to the centre or vice versa) are described for instance in EP-A-0 570 341.

Spiral wound modules for electrodeionisation, in which the concentrate is guided tangentially but the electrolyte to be desalinated is guided axially (i.e. from one front side of the module to the other front side) are described in WO-A-2004/101119 and in U.S. Pat. No. 6,190,528.

In all of the cited embodiments a continuous electrochemical desalination is described, in which cation and anion exchange membranes are arranged alternatingly between two electrodes, cathode and anode. The space between two adjacent membranes each defines a dilution chamber or a concentrate chamber, respectively. The dilution chamber is filled with either ion exchange resin and/or ion conductive material to define the chamber geometry. The concentrate chamber is formed from a mesh of plastic (spacer) and/or ion conductive material (e.g. ion exchange resin). The number of dilution and concentrate chambers can vary from a repeating unit to a plurality (technically designed max. 36). The respective designed possibilities to seal individual chambers against the outside can be seen in the quoted specifications.

In operation of the modules the dilution chamber or dilution chambers are passed through in a single passage, while the concentrate side can be passed through in a single or repeated passage depending on the mode of operation. The distribution of the inflowing water in the module onto the individual chambers is achieved via internal distribution systems.

When the dilution chamber is flowed through under pressure the water to be treated is guided over the ion exchanger resin. Depending on the operating conditions wear debris and fine particles may be generated due to the mechanical stress through the pressure drop over the ion exchange resin. Usually, the influx and efflux openings of the individual chambers are shaped such that no ion exchanger grain and no bigger fragments of the ion exchanger grain can be flushed out of the chambers. This can be effected e.g. by introducing a resin safety mesh. The separation limit of the mesh is at around 200 µm. Smaller particles may pass through the mesh and thus reach the subsequent process stages of the water treatment, together with the product water. Microorganisms, usually having a size of between 0.2 and 5 µm, from process stages upstream of the electrodeionisation module may also be regarded as particles, since the process of water treatment, e.g. for the pharmaceutical, microelectronic, or power plant industry, is, from an economic point of view, not carried out under sterile conditions. Thus, in order to protect subsequent process stages against particles, a membrane module, such as an ultrafiltration module, is often connected in series downstream of the electrodeionisation module.

On the other hand, it has been shown that in operation of modules for electrodeionisation as described above, the packing density of the ion exchange resin in the dilution chamber has a favorable effect on the achievable quality (residual conductivity) of the product water. The packing density of the ion exchanger can in turn be influenced via the internal pressure (not the pressure drop) in the electrodeionisation module. Until now, to achieve a certain internal pressure an adjustable pressure-maintaining valve was provided downstream of the electrodeionisation module but upstream of the membrane module, whereby an appropriate counter pressure was applied to the product water side (diluate) of the electrodeionisation module. For spiral wound modules where the flow of the electrolyte is guided tangentially, this counter pressure was typically selected between about 0.5 and 1 bars; for spiral wound modules where the flow of the electrolyte is guided axially, this counter pressure was typically selected at around 0.3 to 3 bars.

It is an object of the invention to provide a device and a process in which the required counter pressure on the diluate side of the electrodeionisation module can be achieved during its operation, while simultaneously the separation of particles, wear debris of the ion exchange resin and/or of microorganisms can be achieved.

SUMMARY OF THE INVENTION

The object is solved according to the invention by a device for the electrodeionisation of an aqueous electrolyte solution, comprising an electrodeionisation module, an ultrafiltration module and a connection piece which connects the electrodeionisation module and the ultrafiltration module such as to be able to guide a diluate produced from said electrolyte solution during operation of said device in said electrodeionisation module from said electrodeionisation module to said ultrafiltration module; wherein said connection piece comprises no adjustable pressure-maintaining valve.

Preferred embodiments of the device according to the invention arise from the dependent claims.

DETAILED DESCRIPTION OF THE INVENTION

Surprisingly, it was found that an ultrafiltration module, which is situated downstream of the electrodeionisation module, is not only suitable for separating ion exchanger residues and bacteria from the diluate but also simultaneously serves for producing the counter pressure behind the electrodeionisation module, which is important for maintaining the packing density of the ion exchanger in the electrodeionisation module. This is also surprising because the ultrafiltration modules do not produce a constant, predictable counter pressure; in the course of their operation they gradually become clogged with filter residues and thus produce behind the electrodeionisation module a counter pressure increasing in time. Using the ultrafiltration modules as counter pressure producing means obviates the need to install a pressure-maintaining valve in or downstream of the electrodeionisation module, or upstream of or in the ultrafiltration module.

Within the scope of the present application "electrodeionisation module" is understood as any electrochemical cell, comprising:

a) an electrolyte solution-filled or electrolyte solution-flowed through cathode compartment having a cathode and a cation exchanger membrane, the cation exchanger membrane forming one of the spatial limitations of the cathode compartment, and wherein the electrolyte solution (=catholyte) which fills or flows through the cathode compartment contacts the cathode and the cation exchanger membrane;

b) an electrolyte solution-filled or electrolyte solution-flowed through anode compartment having an anode and an anion exchanger membrane, the anion exchanger membrane forming one of the spatial limitations of the anode compartment, and wherein the electrolyte solution (=anolyte) which fills or flows through the anode compartment contacts the anode and the anion exchanger membrane; and c) an intermediate compartment, said cation exchanger membrane and said anion exchanger membrane forming two of the spatial limitations of this intermediate compartment. Optionally the intermediate compartment may be subdivided into subcompartments by further cation and anion exchanger membranes located therein in pairs and arranged spaced apart from each other. All cation and anion exchanger membranes which limit and optionally subdivide the intermediate compartment are arranged in alternating order, when viewed along the gradient of the electrical field. If viewed from the cathode towards the anode along the gradient of the electrical field, then each of the subcompartments enclosed by a cation exchanger membrane/anion exchanger membrane pair is filled with an ion exchange resin, preferably a mixed bed ion exchange resin, or with an ion conductive material, and is flowed through by the electrolyte solution to be desalinated (="diluate chambers"), while each subcompartment enclosed by an anion exchanger membrane/cation exchanger membrane pair is flowed through by the electrolyte solution to be concentrated (="concentrate chambers"). The electrolyte solution present in the cathode compartment a) and the anode compartment b) is also concentrated with electrolytes during the electrochemical operation, hence they are also "concentrate chambers". The electrolyte solution in a diluate chamber contacts both ion exchanger membranes limiting the diluate chamber and is separated from the electrolyte solution of an adjacent concentrate chamber by at least one such ion exchanger membrane.

Preferred examples of electrodeionisation modules that can be used according to the invention are the plate modules and spiral wound modules mentioned above. In plate modules the concentrate and diluate chambers are all passed through in parallel flow without being interconnected. In a spiral wound module the outlet of each concentrate chamber (viewed in the direction of the gradient of the electrical field) is directly connected to the inlet of a next concentrate chamber (i.e. the cation exchanger or anion exchanger membrane, respectively, of one concentrate chamber is seamlessly connected with the cation exchanger or anion exchanger membrane, respectively, of the next concentrate chamber), and inlets and outlets for the concentrate are only provided in the anode compartment b) and in the cathode compartment a). Likewise, the outlet of a diluate chamber is directly connected with the inlet of a next diluate chamber (viewed in the direction of the gradient of the electrical field), and an inlet for the electrolyte solution to be desalinated is provided only in the one outermost diluate chamber and the outlet for the diluate only in the other opposite outermost diluate chamber.

More preferred are spiral wound modules, and particularly preferred are spiral wound modules wherein the flow directions in the concentrate chambers on the one hand and the aqueous electrolyte solution to be desalinated in the diluate chambers on the other hand overcross each other; and whereby the flow direction in the diluate chambers runs in parallel to the winding axis of the spiral wound module, i.e. axially.

Within the scope of the present application "ultrafiltration module" is understood as any filter capable of removing microorganisms by filtration from an aqueous solution. For this, ultrafiltration modules typically contain at least one semipermeable membrane made of a polymer having an adequate pore size. Examples of such polymers are for instance polyolefins such as polyethylene, polypropylene or poly(4-methylpentene-1); polysulphones; polyethersulphones; aromatic polyamides; polyimides; polyamides-imides; or fluorine-containing polymers such as polyvinylidene fluoride, polytetrafluoro-propylene, copolymers of hexafluoropropylene, and tetrafluoropropylene. The exclusion limit of the membrane is typically in the range of 5000 to 400000 daltons. An ultrafiltration module to be used according to the invention preferably contains the semipermeable membrane in the form of a plurality of hollow fibers. For membranes in the form of hollow fibers polyvinylidene fluoride and polyether sulphones are preferred as polymers. The hollow fibers preferably have a pore width of about 0.01 to about 0.2 µm, more preferably of about 0.05 to about 0.2 µm. They preferably have an inner diameter of about 10 to about 200 µm, more preferably of about 50 to about 150 µm. The total membrane surface, which is formed in such an ultrafiltration module by all hollow fibers, is preferably about 0.01 to about 3 m$^2$, more preferably about 0.05 to about 1.5 m$^2$. The manufacture of hollow fibers with the abovementioned desired characteristics has been known per se for a long time; reference is made by example only to the paragraph "Hollow Fiber Membranes" in "Kirk-Othmer Encyclopedia of Chemical Technology", 3$^{rd}$ edition, John Wiley & Sons 12:492-517 (1984). Ultrafiltration modules with hollow fibers of the above-described type are known from the household, such as filters in water taps (see e.g. WO-A-02/076589 or U.S. Pat. No. 5,045,198).

The aqueous solution to be filtered is guided into the ultrafiltration module via an inlet opening and can either enter from the outer space of the hollow fibers into their lumen, or exit from the lumen of the hollow fiber into the outer space; the former is preferred. The hollow fibers can run in the longitudinal direction in the ultrafiltration module (such as parallel to a longitudinal axis of the ultrafiltration module), such that they therein form a straight bundle. Preferably, however, the hollow fibers are bent into a U-shape inside the ultrafiltration module and point with their open ends towards the filtrate side of the ultrafiltration module. The diluate to be filtered, coming from the electrodeionisation module, is guided into the interior of the ultrafiltration module and enters the hollow fibers, as mentioned above as preferable. Since both ends of each hollow fiber point to the filtrate side of the ultrafiltration module both ends form an outlet for the filtrate. The filtrate exiting the hollow fibers can be removed from the ultrafiltration module via an adequate outlet opening which is hydraulically connected to the ends of the hollow fibers.

As the "connection piece connecting the electrodeionisation module and the ultrafiltration module such as to be able to guide the diluate produced from the electrolyte solution in said electrodeionisation module during the operation of said device from said electrodeionisation module to said ultrafiltration module" is understood any assembly part that can carry out such a function. Examples of these are pipes, conduits, tubes or connecting pieces; or also a mounting or bracket part for the electrodeionisation module and/or the ultrafiltration module(s) which simultaneously has means for guiding the diluate (such as inner openings or channels). Such a mounting or bracket part may preferably also comprise a collection system which collects the diluate exiting from a plurality of outlet openings of the electrodeionisation module and transfers it in one single conduit to the ultrafiltration module; it may also contain a distribution system, which evenly distributes the diluate coming from the electrodeionisation module to a plurality of ultrafiltration units connected in parallel.

Within the present application "adjustable pressure-maintaining valve" is understood as a valve whose interior pressure drop can be variably adjusted. The device according to the invention does not comprise such a pressure-maintaining valve in the connection piece, and preferably it is also devoid of such a pressure-maintaining valve inside the electrodeionisation module and also inside the ultrafiltration module. If the device according to the invention has a plurality of ultrafiltration modules and correspondingly possibly a plurality of connection pieces connecting the electrodeionisation module and each of these ultrafiltration modules, then none of these connection pieces and none of the ultrafiltration modules contain such a valve.

Within the present application two cavities or recesses (collection spaces, channels, bores, recesses, distribution spaces or openings) are "hydraulically connected" if they allow the passage of liquid from one cavity to the other cavity without leaking that liquid and without appreciable pressure drop.

The manufacture of the device according to the invention is according to the art since the used electrodeionisation modules and ultrafiltration modules are known per se. The hydraulic connection of the above-described connecting piece with the ultrafiltration modules and with the collection system of the spiral wound module may be carried out by glueing, welding or by a screw tube fitting, depending on the pair of materials involved.

A further possibility of connecting the ultrafiltration modules with the connecting piece in an outer housing pipe is by using one or more tie-rods. The ultrafiltration modules in the corresponding openings of the connecting element are sealed by elastomer seals. The flow guidance in the device according to the invention thus results from a connection on the influx side, an optional integrated distribution system in the connecting piece (which distributes the diluate onto the ultrafiltration modules), the flowing in parallel through the individual ultrafiltration modules, and an optional integrated collection system in an optional filter holding plate (which collects the filtrate exiting from the ultrafiltration modules). The correct spacing between the connecting piece and the filter holding plate may be achieved, if desired, by rods or distance supports. The remaining clearance in the combination of connecting piece/ultrafiltration units/filter holding plates/optional distance supports is not flowed through and is designed as an air space.

The individual ultrafiltration modules are typically flowed through at a volume flow of 100 l/h to 600 l/h, preferably of 250 to 400 l/h. The number of ultrafiltration modules to be incorporated therefore results from the integral quotient of the nominal volume flow of the electrodeionisation module and the preferred volume flow of each ultrafiltration module (i.e. for e.g. 500 l/h 2 pieces and for 1000 l/h at least 3 pieces).

Hydraulically connecting the above-described connecting element and the filter holding plate with the ultrafiltration units and the collection system of the electrodeionisation module can be performed with a seal ring having an integrated O-ring seal. For the technical implementation of the device the electrodeionisation module is preferably surrounded by a reinforced plastic casing or a steel or stainless steel pipe.

For the technical implementation the device according to the invention, comprising (or particularly consisting of) an electrodeionisation module, ultrafiltration modules, the connecting piece and a filter holding plate, is surrounded by a reinforced plastic casing or a steel or stainless steel pipe having a fixed flange. The connection of the electrodeionisation module and the device is done by screwing the flange lid and the fixed flange together.

The devices according to the invention are suitable for the electrodeionisation of raw waters usually employed for this purpose. These are, for example, natural raw waters, tap water or sea water. These all contain certain proportions of dissolved salts, dissociated in ions and are therefore all electrolytes. Preferably, the raw water is previously partly desalinated and/or softened, such as by an upstream reverse osmosis step. The raw water, i.e. the electrolyte to be desalinated, may also previously have been subjected to a germicidal treatment, for instance through UV radiation, a treatment with ozone, chlorine or hypochlorite; it may also have been subjected beforehand to filtration for removing airborne particles and/or microorganisms.

DESCRIPTION OF THE FIGURES

The invention will now be further illustrated with reference to the drawings, in which.

Figure 1:
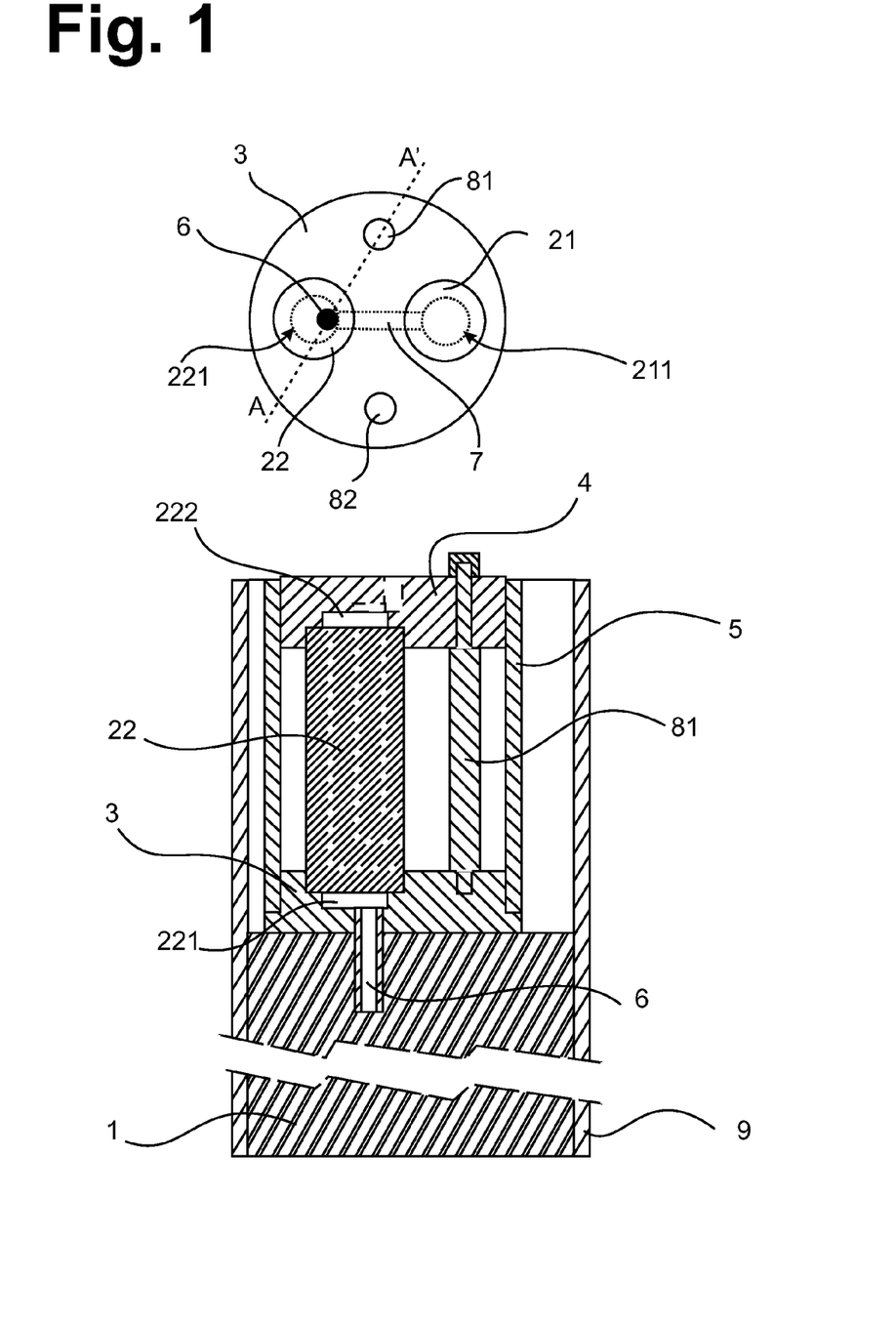
FIG. 1 is a sectional view of a first embodiment of the device according to the invention, showing at the top again the connecting piece used therein in a plan view.

EMBODIMENT 1 (FIG. 1)

Figure 5:
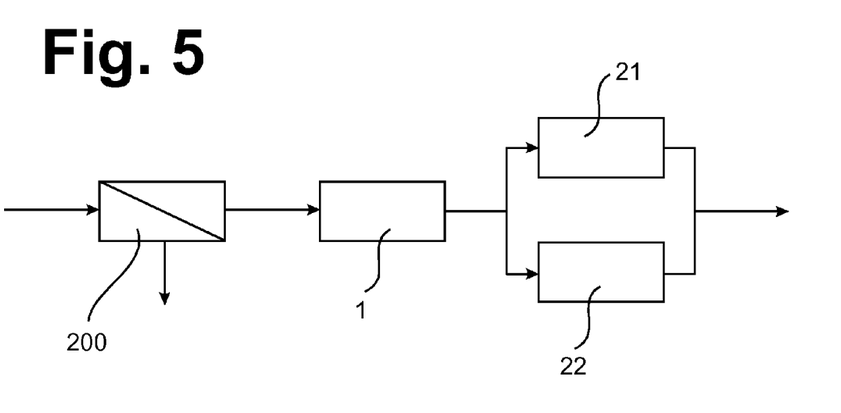
FIGS. 5 and 6 show the device embodiments of FIGS. 1 and 2, respectively, with a further reverse osmosis upstream of the electrodeionisation module.

In this embodiment a spiral wound module is employed as electrodeionisation module 1, in which the electrolyte solution to be desalinated and the concentrate are guided tangentially through the spirally wound diluate and concentrate chambers. Preferably, the raw water is previously partly desalinated and/or softened, such as by an upstream reverse osmosis step 200, as shown in FIG. 5. It is designed for a nominal capacity of typically about 400 to about 700 l/h of electrolyte solution to be deionised. The hydraulic and electrical connections of the spiral wound module are not shown here. This embodiment has two ultrafiltration modules 21, 22 (hollow fiber membrane filters). They are commercially available legionella filters fitted with hollow fiber membranes having an exclusion limit of about 100000 daltons. The hollow fibers are bent in a U-shape (see preceding general description). The two ultrafiltration units are held on their sides facing the spiral wound module by a connecting piece 3. On the filtrate side of the two ultrafiltration units 21, 22 these are held by a filter holding plate 4. Connecting piece 3 and filter holding plate 4 are located in an outer housing pipe 5 made of steel, stainless steel or plastic. The connecting piece 3 (shown again in the upper part of the Figure in a plan view, seen from the ultrafiltration modules 21, 22) has an opening 6, which guides the diluate from the spiral wound module to the two ultrafiltration units 21, 22. Running inside the connecting piece 3 is a channel 7, hydraulically connecting the sockets 211, 221 of the two ultrafiltration units 21, 22 and thus forming a distribution system which distributes the diluate passing through opening 6 onto the two ultrafiltration units 21, 22. Also, between connecting piece 3 and filter holding plate 4 two distance supports 81, 82 made of chromium steel are present. The combination of connecting piece 3, ultrafiltration units 21, 22, filter holding plate 4, housing pipe 5 and distance supports 81, 82 is cut along section plane A-A' in FIG. 1; the location of which is indicated in connecting piece 3 shown again above. Due to the location of section plane A-A' only one ultrafiltration module 22 and only one distance support 81 is visible in FIG. 1; for this reason channel 7 is not visible in this sectional view. In connecting piece 3 bores 211, 221 are provided for accommodating the ultrafiltration modules; also, in filter plate 4 corresponding bores (only one with reference numeral 222 being visible) are contained. The ultrafiltration modules 21, 22 may be fixedly connected in the individual bores 211, 221, 222 with the connecting piece 3 and the filter plate 4 through bonding or welding or by means of seal rings. The flow of the diluate exiting the spiral wound module occurs through opening 6, through said distribution system in the connecting element 3, through the two ultrafiltration modules 21, 22 in parallel connection and then, optionally, through a corresponding collection system (not shown in the Figure), incorporated into the filter holding plate, and then via an also optional adapter, which is not shown in the Figure. The space between connecting piece 3 and filter holding plate 4 outside ultrafiltration modules 21, 22 and housing pipe 5 is not flowed through and is designed as an air space. The inlets and outlets for the concentrate, the influxes for the electrolyte solution to be desalinated and the electrical connections are not shown in the Figure; they would be present outside the housing pipe 5 on the front side of the device. The entire device according to embodiment 1 can be incorporated in a preferably cylindrical casing element 9.

Figure 2:
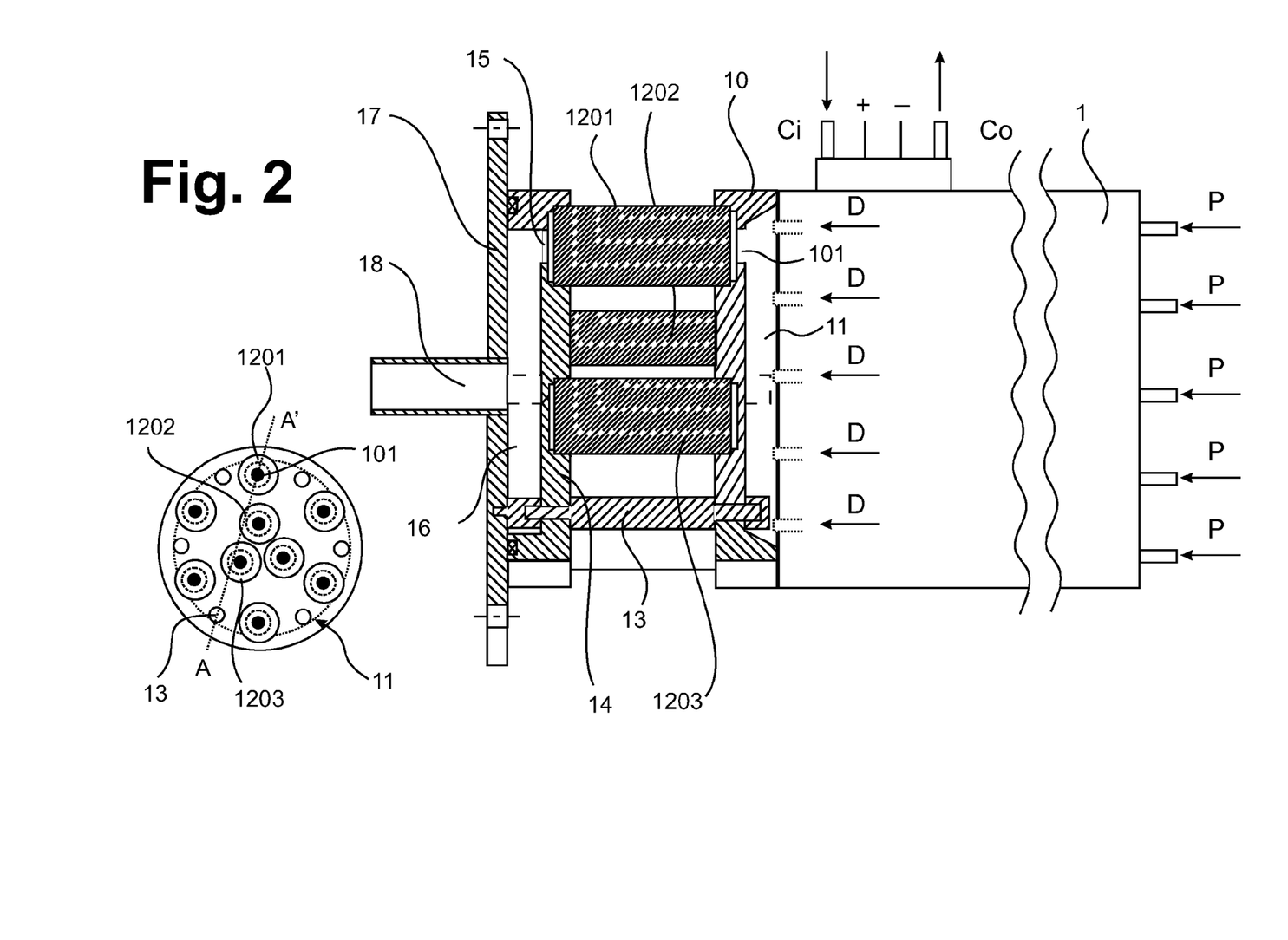
FIG. 2 is a sectional view of a second embodiment of the device according to the invention, showing at the bottom left again the connecting piece used therein in a plan view.

EMBODIMENT 2 (FIG. 2)

Figure 6:
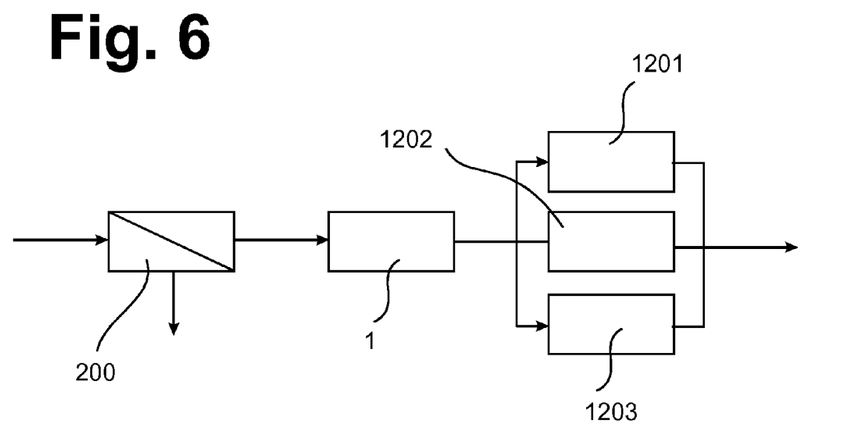

This embodiment of the device according to the invention is designed for a nominal capacity of typically about 2500 to about 3300 l/h of electrolyte solution to be deionised. It contains as the electrodeionisation module 1 a spiral wound module, wherein the diluate and concentrate are guided in cross-flow (with the diluate being guided axially). "P" indicates the axial influxes of the electrolyte solution to be desalinated ("P" stands for permeate, since the electrolyte being supplied is preferably already the permeate of a partial desalinating reverse osmosis 200 being located upstream, as shown in FIG. 6). "D" indicates the axial effluxes of the diluate. "Ci" denotes the inlet for the concentrate (Concentrate inlet) and "Co" denotes the outlet for the concentrate (Concentrate outlet). The two connections for the direct current are also indicated with "+" and "−". The diluate outlets D of the electrodeionisation module 1 lead into a connecting piece 10 (for instance made of a polyoxymethylene copolymer) having a collection space 11 and nine openings for the diluate exiting the electrodeionisation module 1 (only one of these is shown with reference numeral 101). Each of the nine openings is drilled and shaped such that one ultrafiltration module can be inserted in each of them using one seal ring each (for instance made of EPDM rubber or NBR). The nine ultrafiltration modules in total (only three of these are shown with reference numerals 1201, 1202, 1203) are commercially available legionella filters, fitted with hollow fiber membranes having an exclusion limit of 100000 daltons. The hollow fibers are bent in a U-shape (see preceding general description). The nominal maximum passage volume of each ultrafiltration module 1201, 1202, 1203 is about 800 l/h. The nine ultrafiltration modules are fitted between connecting piece 10 and a filter holding plate 14 with the aid of six distance supports made of chromium steel (only one of these is shown with reference numeral 13). The filter plate 14 in turn has nine openings for the filtered permeate (only one of these is shown with reference numeral 15), the ultrafiltration modules being fitted therein by means of seal rings made of EPDM rubber, silicone rubber or NBR. The filter holding plate 14 also has a collection space 16 on its outer side for the filtered diluate. This collection space 16 is shut off through a screwed on flange lid 17 with a central outlet connection 18. The combination of connecting piece 10, the nine ultrafiltration modules, the six distance supports and the filter holding plates 14 is shown cut off in the Figure. The connecting piece 10 is shown again in the Figure at the bottom left in a plan view, seem from the ultrafiltration modules; here the location of the section plane A-A' is indicated, in which said combination is shown cut off. Here the arrangement of all nine ultrafiltration modules is visible: six of them are arranged in a circular arrangement outside on the connecting piece, the remaining three are arranged in the centre of the connecting piece. The six distance supports are also shown here (only one of the supports, which is visible cut off in the sectional view is indicated again by reference numeral 13). The dotted circle 11 indicates the collection space for the diluate exiting the electrodeionisation module 1; the dots indicate that the collection space is on the back of the connecting element 10.

Figure 3:
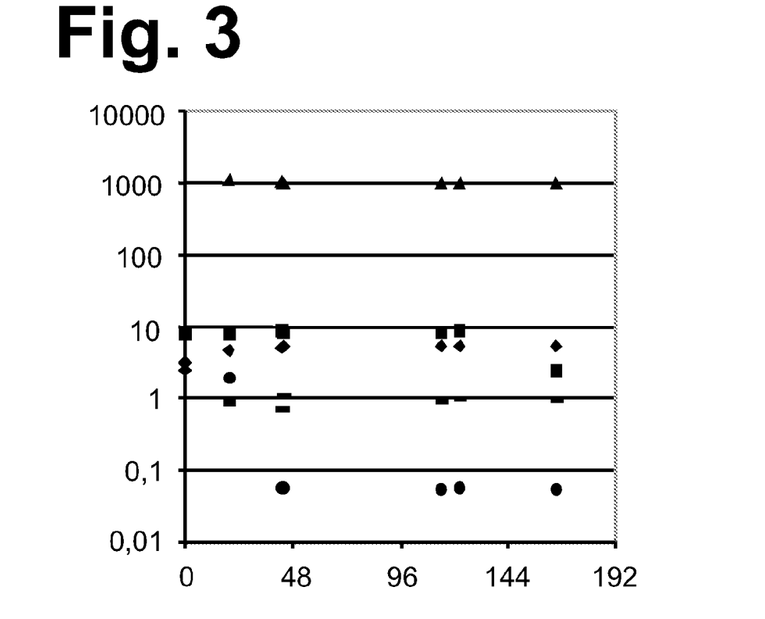
FIGS. 3 and 4, respectively, show the results of comparative tests concerning the formation and quality of the diluate in a prior art device and the device according to embodiment 1, respectively.
Figure 4:
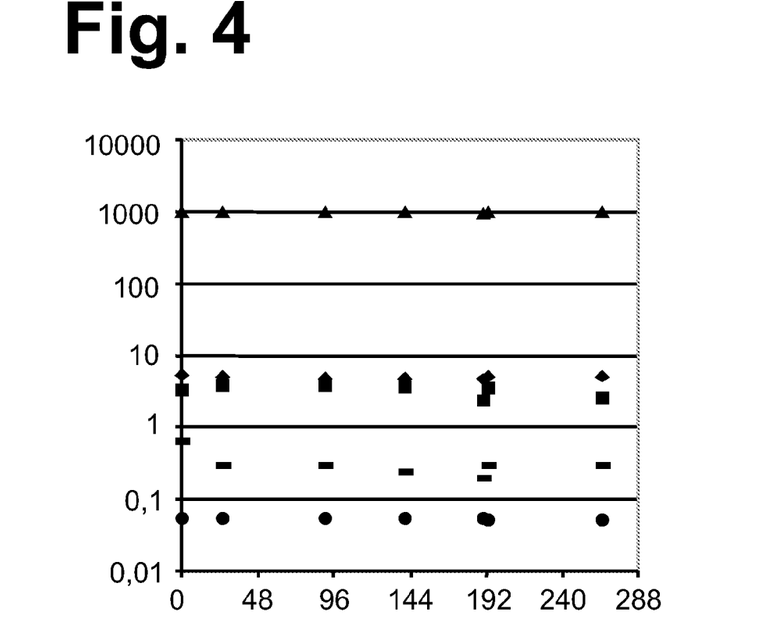

Comparative Test (FIGS. 3 and 4)

On the one hand a conventional device for electrodeionisation, comprising a spiral wound module according to EP-A-0 570 341 and a downstream-situated pressure-maintaining valve, and on the other hand an device according to the invention according to embodiment 1 not containing a pressure-maintaining valve, were compared with each other in a long-term test regarding the operating parameters, particularly regarding the counter pressure occurring behind the spiral wound module, and regarding the rate of production and the residual conductivity of the diluate formed in the spiral wound module. The results are shown in FIGS. 3 and 4. In these Figures:
• is the residual conductivity of the diluate (in μS/cm);
- is the counter pressure in the diluate, thus behind the spiral wound module (in bar);
▲ is the rate of production of diluate (in l/h);
♦ is the pressure in the reverse osmosis permeate fed to the spiral wound module (in bar); and
■ is the residual conductivity in the reverse osmosis permeate fed to the spiral wound module (in μS/cm).

In the conventional device water from a reverse osmosis was fed to the spiral wound module under pressure. On the diluate side (pure water) of the module a counter pressure of approx. 1 bar was set by means of the pressure-maintaining valve. By applying a typical potential to the electrodes of the spiral wound module diluate was produced during 192 hours. The measured operating parameters are illustrated in FIG. 3. As can be seen from FIG. 3, a constant water quality of 0.058 μS/cm at a rate of production of 1000 l/h was achieved.

The device according to embodiment 1 was also fed with permeate from a reverse osmosis 200, as shown in FIG. 5. On the diluate side (i.e. behind the spiral wound module) of the device the counter pressure was produced solely by the two ultrafiltration modules 21, 22 downstream, since no pressure-maintaining valve was present here. By applying a typical potential to the electrodes of the spiral wound module diluate was produced during 288 hours. The measured operating parameters are illustrated in FIG. 4. As can be seen from FIG. 4 a constant water quality of 0.055-0.056 µS/cm at a volume flow of 1000 l/h was also achieved.

The invention claimed is:

1. A device for the electrodeionisation of an aqueous electrolyte solution, comprising an electrodeionisation module (1), a plurality of ultrafiltration modules (21, 22, 1201, 1202, 1203) connected in parallel and a connection piece (3, 10) which mounts the ultrafiltration modules to the electrodeionisation module (1), said connection piece including a collection space communicating with each of the ultrafiltration modules (21, 22, 1201, 1202, 1203) such as to be able to guide a diluate produced from said electrolyte solution during operation of said device in said electrodeionisation module (1) from said electrodeionisation module (1) to said ultrafiltration modules (21, 22, 1201, 1202, 1203); said connection piece (3, 10) being devoid of an adjustable pressure-maintaining valve, the ultrafiltration modules (21, 22, 1201, 1202, 1203) comprising a semipermeable membrane with an exclusion limit in the range of 5000 to 400000 daltons such that the ultrafiltration modules are configured to produce an internal pressure drop and such that a counter pressure in the range of 0.3 to 3 bars is built up behind the electrodeionization module (1) which is sufficient to ensure a packing density of the ion exchanger in the electrodeionisation module (1).

2. The device according to claim 1 wherein the electrodeionisation module (1) is in the form of a spiral wound module, the flow of the electrolyte solution to be desalinated is guided axially in said spiral wound module, and the counter pressure behind the electrodeionization spiral wound module (1) built up by the internal pressure drop behind the ultrafiltration modules (21, 22, 1201, 1202, 1203) is in the range of 0.3 to 3 bars.

3. The device according to claim 2 further comprising a reverse osmosis (200) device upstream of the electrodeionisation module (1).

4. The device according to claim 2 wherein the ultrafiltration modules (21, 22, 1201, 1202, 1203) are configured to produce behind the electrodeionisation module (1) a counter pressure which increases in time by becoming clogged by ion exchanger residues.

5. The device according to claim 4 wherein each ultrafiltration module (21, 22, 1201, 1202, 1203) comprises filter membranes in the form of hollow fibers which are bent in a U-shape and have opposite ends, the opposite ends of each hollow fiber are hydraulically connected with an outlet opening of the ultrafiltration module (21, 22, 1201, 1202, 1203), and the ultrafiltration module is configured such that the diluate from the electrodeionisation module (1) is filtered at the hollow fibers by entering lumens of the hollow fibers from an environment surrounding the hollow fibers.

6. The device according to claim 1 wherein the electrodeionisation module (1) is in the form of a spiral wound module, the flow of the electrolyte solution to be desalinated is guided tangentially in said spiral wound module, and the counter pressure behind the electrodeionization spiral wound module (1) built up by the internal pressure drop behind the ultrafiltration modules (21, 22, 1201, 1202, 1203) is in the range of 0.5 to 1 bar.

7. The device according to claim 6 further comprising a reverse osmosis (200) device upstream of the electrodeionisation module (1).

8. The device according to claim 6 wherein the ultrafiltration modules (21, 22, 1201, 1202, 1203) are configured to produce behind the electrodeionisation module (1) a counter pressure which increases in time by becoming clogged by ion exchanger residues.

9. The device according to claim 8 wherein each ultrafiltration module (21, 22, 1201, 1202, 1203) comprises filter membranes in the form of hollow fibers which are bent in a U-shape and have opposite ends, the opposite ends of each hollow fiber are hydraulically connected with an outlet opening of the ultrafiltration module (21, 22, 1201, 1202, 1203), and the ultrafiltration module is configured such that the diluate from the electrodeionisation module (1) is filtered at the hollow fibers by entering lumens of the hollow fibers from an environment surrounding the hollow fibers.

10. The device according to claim 1 further comprising a reverse osmosis (200) device upstream of the electrodeionisation module (1).

11. The device according to claim 1 wherein the ultrafiltration modules (21, 22, 1201, 1202, 1203) are configured to produce behind the electrodeionisation module (1) a counter pressure which increases in time by becoming clogged by ion exchanger residues.

12. The device according to claim 11 wherein each ultrafiltration module (21, 22, 1201, 1202, 1203) comprises filter membranes in the form of hollow fibers which are bent in a U-shape and have opposite ends, the opposite ends of each hollow fiber are hydraulically connected with an outlet opening of the ultrafiltration module (21, 22, 1201, 1202, 1203), and the ultrafiltration module is configured such that the diluate from the electrodeionisation module (1) is filtered at the hollow fibers by entering lumens of the hollow fibers from an environment surrounding the hollow fibers.

13. The device according to claim 1 incorporated into a casing element (9).

14. The device according to claim 1 wherein:
  a) the electrodeionisation module (1) has at least one concentrate chamber and diluate chamber and is in the form of a spiral wound module, in which flows in the concentrate chamber(s) and in the diluate chamber(s) are guided in parallel and tangentially,
  b) each of two to ten of the ultrafiltration modules (21, 22) comprises an inlet opening, an outlet opening, and hollow fibers bent in a U-shape having open ends, the open ends being hydraulically connected with the outlet opening of the ultrafiltration module (21, 22); and
  c) the connecting piece (3) has first and second sides, the first side being attached to the spiral wound module (1), the second side being attached to the ultrafiltration modules (21, 22), the connecting piece having an opening (6) and an inner channel (7) that are hydraulically connected to each other, and each of the ultrafiltration modules (21, 22) is attached to the connecting piece (3) such that the inlet opening of each said ultrafiltration module for the diluate is hydraulically connected with the channel (7).

15. The device according to claim 1 wherein:
  a) the electrodeionisation module (1) has at least one concentrate chamber and diluate chamber and is in the form of a spiral wound module, in which flows are guided tangentially in the concentrate chamber(s) and axially in the diluate chamber(s),
  b) each of two to fifteen of the ultrafiltration modules (1201, 1202, 1203) comprises an inlet opening, an outlet opening, and hollow fibers bent in a U-shape having open ends, the open ends being hydraulically connected with the outlet opening of the ultrafiltration module (21, 22); and c) said connection piece (10) with a first side and a second side, the first side being attached to said spiral wound module (1), the second side being attached to said ultrafiltration modules (1201, 1202, 1203), and having on its first side said collection space (11), which is able to collect the diluate produced in operation of the device in the electrodeionisation module (1) from the electrolyte solution, and having on its second side a number of openings (101) hydraulically connected to the collection space (11), whereby said number of openings (101) is equal to the number of ultrafiltration modules (1201, 1202, 1203), and each ultrafiltration module (1201, 1202, 1203) is attached to said connecting piece (10), such that its inlet opening for the diluate is hydraulically connected to a respective opening (101).

\* \* \* \* \*